Feb. 12, 1957 F. W. LISEC 2,781,024
AUTOMATIC WATER FOUNTAIN FOR POULTRY
Filed March 30, 1955
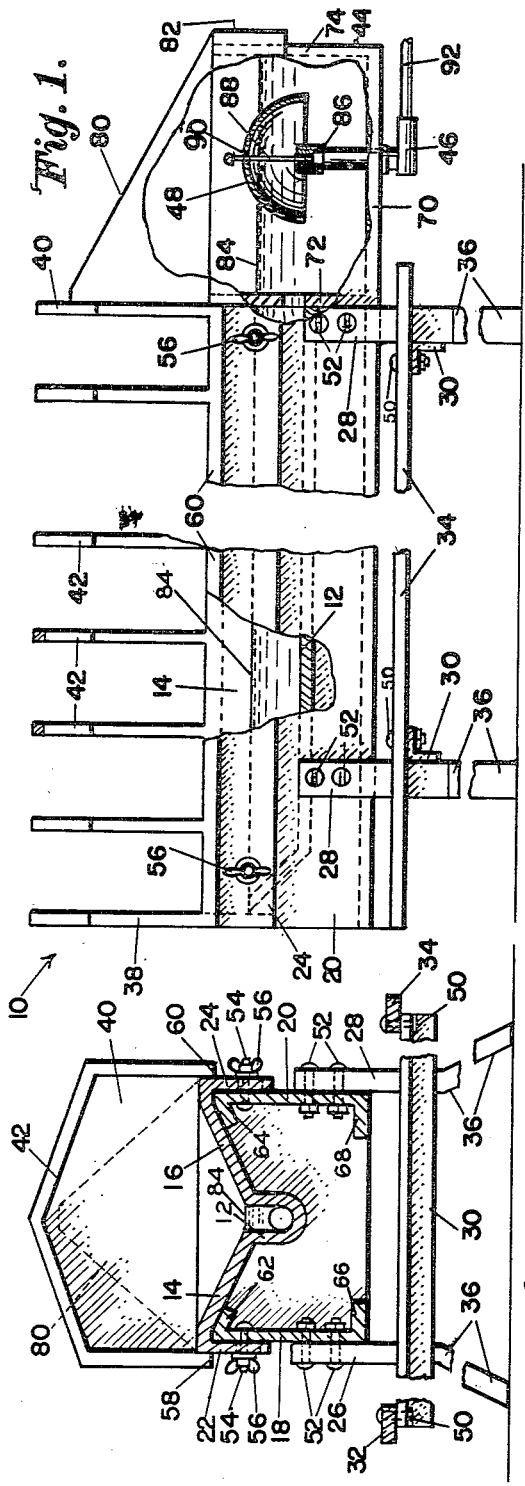
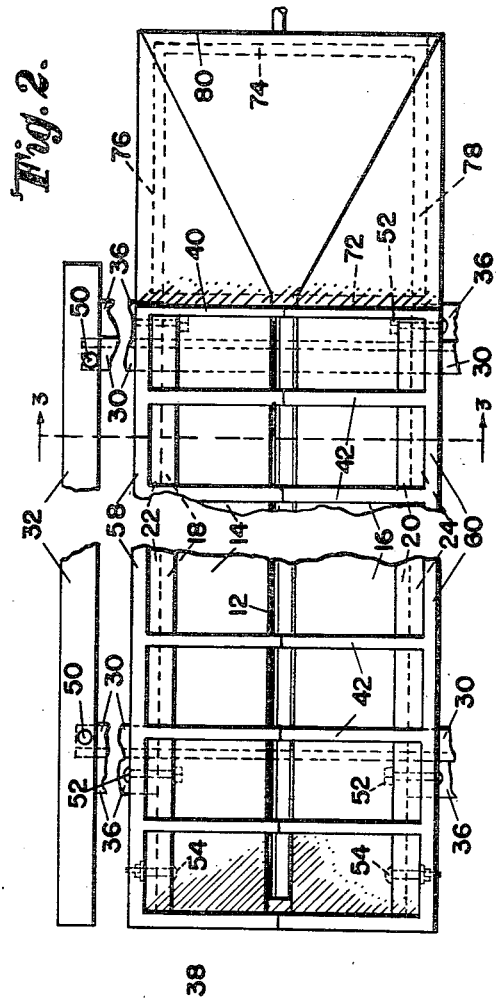
INVENTOR.
F. W. Lisec
BY Arthur H. Sturges.
Attorney

United States Patent Office 2,781,024
Patented Feb. 12, 1957

2,781,024

AUTOMATIC WATER FOUNTAIN FOR POULTRY

Frank W. Lisec, Wymore, Nebr.

Application March 30, 1955, Serial No. 497,933

2 Claims. (Cl. 119—80)

This invention relates to poultry watering devices of the type connected to a continuous water supply wherein clean fresh water is maintained in a trough, and in particular a relatively narrow trough having upwardly inclined side panels extended from the sides thereof and providing means for preventing the wattles of fowl drinking from the trough coming in contact with the water so that water is not dropped upon litter at the sides of the trough, and a feeder tank with a bell providing a float therein whereby the bell opens and closes a valve in the water supply so that a continuous quantity of fresh clean water is maintained in the trough.

The purpose of this invention is to provide a watering trough for poultry in which the width of the portion of the trough from which the poultry take the water is only sufficient to receive the bill of a chicken or the like thereby making it impossible for the wattles of the chicken to pick up water as the chicken drinks from the trough.

In the conventional type of drinking fountain or trough the wattles of poultry are suspended in the water as the bills are dipped into the water and as the head is raised to permit the water to pass through the throat water drops from the wattles and bill causing damp matted litter at the sides of or around the drinking fountain.

With this thought in mind this invention contemplates an improved poultry drinking fountain or trough in which the water is contained in a narrow channel, and the water is maintained at a constant level in the channel by a bell controlled water supply tank at one end of the trough. The fountain is also provided with side panels inclined upwardly from the sides of the channel and spaced hoops between which the heads of poultry must be placed for drinking and which also discourage poultry roosting above the drinking trough.

The object of this invention is, therefore, to provide means for forming a watering trough for poultry in which the amount of water dropped on the ground or on litter thereon is reduced to a minimum.

Another object of the invention is to provide a poultry watering trough in which it is substantially impossible for wattles of poultry drinking therefrom to dip into the water of the trough.

Another important object of the invention is to provide a poultry watering trough in which a fresh supply of clean water is maintained continuously.

It is yet another object of the invention to provide a poultry watering trough which is of a relatively small cross sectional area and in which inclined panels at the sides of the trough catch water dripping from bills and wattles whereby water dropping from the heads of poultry drinking from the trough drains back into the trough.

A further object of the invention is to provide an improved watering trough for poultry in which a relatively narrow channel that retains water for drinking is protected by spaced hoops and fenders so that droppings from the poultry do not come in contact with the water, the fenders being readily removable for cleaning.

A still further object is to provide a poultry watering trough having a narrow drinking channel with upwardly inclined panels at the sides in which the trough is adjustably supported so that the drinking channel may be level when the trough is used on rough or sloping terrain.

And a still further object is to provide an improved poultry watering trough in which the wattles are not permitted to dip into the water of the trough and in which water dropping from the bill and other parts of the head is drained by sloping panels back into the trough in which the trough is of a simple and economical construction.

With these and other objects and advantages in view the invention embodies an elongated trough adjustably mounted between standards extended upwardly from cross beams which are supported by legs, a narrow elongated channel suspended by inclined panels from upper edges of the trough, side rails also carried by the cross beams and positioned to provide standing platforms for fowl while drinking, spaced hoops extended upwardly from sides of the trough to prevent fowl roosting above the channel, and a tank having a water level control bell therein connected to one end of the trough and having a water supply connection extended therefrom whereby fresh clean water is provided in the channel continuously.

Other features and advantages of the invention will appear from the following descripiton taken in connection with the drawings, wherein:

Figure 1 is a side elevational view of the improved poultry watering trough with parts broken away showing a portion of the narrow drinking channel and also showing the water level control bell.

Figure 2 is a plan view of the watering trough also with parts broken away.

Figure 3 is a cross section through the trough taken on line 3—3 of Figure 2.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a narrow channel in which drinking water is maintained, numerals 14 and 16 panels inclined upwardly from edges of the channel which with the channel provide a tray, numerals 18 and 20 side walls the upper edges of which are connected to vertically disposed flanges 22 and 24 extended from the upper ends of the panels 14 and 16, numerals 26 and 28 uprights extended upwardly from cross beams 30, numerals 32 and 34 side rails upon which the poultry stand while drinking from the channel 12, numeral 36 legs for supporting the cross beams, numerals 38 and 40 end frames extended upwardly from the ends of the trough, numeral 42 intermediate frames or hoops extended upwardly from the flanges 22 and 24 and extended over the channel 12, and numeral 44 a tank positioned at one end of the trough and having a water supply valve 46 and a bell 48 for controlling the level of the water in the channel.

The beams 30, which are formed of angle irons, are secured to the legs 36 and uprights 26 and 28 by welding or other suitable means, and the rails 32 and 34 are secured to the ends of the beams with fasteners, such as bolts 50. The side walls 18 and 20 are secured to the uprights 26 and 28 with bolts 52, and the flanges 22 and 24 of the inclined panels 14 and 16 are adjustably secured to the upper edges of the side walls 18 and 20 with bolts 54 having thumb nuts 56 thereon.

The frames 38 and 40 and the intermediate hoops 42 are secured to side bars 58 and 60 which extend over the upper edges of the flanges 22 and 24. With the hoops and frames mounted in this manner both the hoops and frames, which may be covered with plates or aprons, may readily be removed to facilitate cleaning the channel.

As shown in Figure 3, the upper edges of the side walls 18 and 20 are provided with flanges 62 and 64 upon which the panels 14 and 16 rest. The lower edges of the side walls are also provided with flanges 66 and 68 which reinforce the walls, the walls and also the panels 14 and 16 being formed of sheet metal.

The side walls 18 and 20 extend beyond the end of the trough on which the tank 44 is positioned, providing supporting means for the tank, and, as shown in Figures 1 and 2, the tank is provided with a base 70, end walls 72 and 74, and side walls 76 and 78. The tank is also provided with a cover 80 having a flange 82 extended over the upper edges of the walls of the tank, and the water level, as indicated by the numeral 84 is in the same horizontal plane as that of the upper edge of the channel 12. The water is maintained at a constant level by the supply valve 46 from which a cage 86 extends and the cage is provided with a piston rod 88 that is connected to the bell 48 at the point 90 whereby as water is used from the channel 12 the valve 46, which is connected to a water supply pipe 92, is opened by the bell to replenish the water used from the channel.

With the hoops 42 positioned over the relatively narrow channel 12 it is necessary for a fowl to place its head between the hoops and dip its bill into the water of the channel. The channel being very narrow permits only the bill of a chicken to dip into the water so that the wattles rest upon the panels 14 and 16 and do not pick up water. The small amount of water that drops from the bill of a chicken as the chicken swallows the water drops upon the inclined panels and drains back into the channel. By this means very little, if any, water drops upon litter at the sides of a drinking trough so that the litter may be maintained in a healthy dry condition.

From the foregoing specification, it will become apparent that the invention disclosed will adequately accomplish the functions for which it has been designed and in an economical manner, and that its simplicity, accuracy, and ease of operation are such as to provide a relatively inexpensive device considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention that which is claimed to be new and desired to be procured by Letters Patent, is:

1. In a poultry drinking fountain, the combination which comprises a supporting structure including side walls connected to uprights carried by cross beams supported on legs, a water channel having side panels with depending flanges at the edges inclined upwardly from sides of the channel and positioned with the flanges extended over the upper edges of said side walls, a supply tank extended from one end of the channel, means for connecting the tank to a source of water supply, and bolts connecting the depending flanges of the inclined panels to the upper edges of the side walls for adjusting the elevation of the channel.

2. A poultry drinking fountain comprising spaced parallel side walls, supporting means upon which the side walls are mounted, a tray having an elongated channel positioned in the center thereof with inclined panels extended outwardly and upwardly from upper edges of the channel, the extended edges of the inclined panels having depending flanges thereon and said flanges being positioned to overlap the side walls, said inclined panels being positioned to receive the wattles of a chicken the bill of which is positioned in the channel, a closure for the channel positioned at one end of the tray, and a water supply tank suspended at the opposite end of the tray and positioned with the interior thereof in communication with the interior of the channel.

References Cited in the file of this patent
UNITED STATES PATENTS

| | | |
|---|---|---|
| 2,292,020 | Venolia | Aug. 4, 1942 |
| 2,502,720 | Haley | Apr. 4, 1950 |
| 2,549,237 | Rau | Apr. 17, 1951 |
| 2,618,237 | McDermott et al. | Nov. 18, 1952 |
| 2,719,509 | Kitson | Oct. 4, 1955 |
| 2,724,365 | Snider | Nov. 22, 1955 |